United States Patent [19]
Hata et al.
[11] Patent Number: 4,748,084
[45] Date of Patent: May 31, 1988

[54] MAGNETIC RECORDING MEDIUM

[75] Inventors: Kotaro Hata; Eitaro Nakamura, both of Kawasaki, Japan
[73] Assignee: Nippon Zeon Co., Ltd., Tokyo, Japan

[21] Appl. No.: 925,292
[22] Filed: Oct. 31, 1986
[30] Foreign Application Priority Data
Nov. 11, 1985 [JP] Japan ............ 60-252286
Nov. 11, 1985 [JP] Japan ............ 60-252287
Nov. 11, 1985 [JP] Japan ............ 60-252288
[51] Int. Cl.[4] ............ G11B 5/702
[52] U.S. Cl. ............ 428/425.9; 252/62.54; 427/128; 428/413; 428/480; 428/522; 428/521; 428/694; 428/900; 428/328; 428/329
[58] Field of Search ............ 428/694, 329, 328, 900, 428/425.9, 522, 413, 695, 480, 521, 704; 427/128; 252/62.54; 360/134–136

[56] References Cited
U.S. PATENT DOCUMENTS
4,368,237 1/1983 Yamada ............ 427/128
4,520,079 5/1985 Nakajima ............ 427/128
4,521,486 6/1985 Nimomiya ............ 428/900
4,526,837 7/1985 Ohtsuki ............ 428/900
4,529,661 7/1985 Nimomiya ............ 428/328
4,562,117 12/1985 Kikukawa ............ 427/128
4,571,364 2/1986 Kasuga ............ 427/128
4,576,726 3/1986 Watanabe ............ 427/128
4,594,174 6/1986 Nakayama ............ 428/900
4,600,521 7/1986 Nakamura ............ 428/900
4,613,545 9/1986 Chubachi ............ 427/128

*Primary Examiner*—Ellis P. Robinson
*Attorney, Agent, or Firm*—Sherman & Shalloway

[57] ABSTRACT

A magnetic recording medium comprising a substrate and a magnetic layer formed thereon, said magnetic layer comprising a vinyl chloride resin, a resin containing an epoxy group, and at least one additive selected from the group consisting of (1) a phosphoric acid ester, (2) a carboxylic acid compound having a pKa of not more than 4, (3) a monosulfate compound and (4) a sulfonic acid compound.

9 Claims, No Drawings

MAGNETIC RECORDING MEDIUM

This invention relates to an improved magnetic recording medium. More specifically, it relates to a magnetic recording medium having excellent dispersibility, thermal stability and durability.

Magnetic recording media such as magnetic tapes or magnetic cards are generally produced by coating a magnetic coating composition comprising a magnetic powder and a binder therefor as a magnetic layer on a substrate such as a polyester film. In recent years, finely divided magnetic powders having a high specific surface area have been used widely in an attempt to achieve an improvement in coercivity, the maximum amount of saturation magnetization, SN ratios and recording densities.

When a magnetic coating composition is prepared by using a vinyl chloride-type copolymer resin such as vinyl chloride/vinyl acetate/vinyl alcohol copolymer resin, vinyl chloride/vinyl acetate/maleic acid copolymer resin or vinyl chloride/vinyl acetate/maleic acid/-vinyl alcohol copolymer resin as a binder for such a fine magnetic powder, the coating composition becomes thickened, or the dispersibility of the magnetic powder is insufficient.

To increase the dispersibility of the magnetic powder, a method is employed in which it is dispersed under application of a high shearing force. This method, however, has the defect that the coating composition becomes thickened, and the temperature rises to induce thermal decomposition of the vinyl chloride-type copolymer resin, and the generated hydrogen chloride gas degrades the magnetic powder and reduces the durability and reliability of the magnetic recording layer.

The addition of a stabilizer for vinyl chloride resins has been well known heretofore to prevent thermal decomposition of vinyl chloride-type copolymer resins. Typically, the addition of a low-molecular-weight epoxy compound such as epoxidized soybean oil or n-butyl glycidyl ether and the addition of a liquid organotin compound such as dibutyltin laurate or dibutyltin maleate are known as examples.

If the low-molecular-weight epoxy compound is used in a large amount, it bleeds out from the magnetic recording medium to contaminate the recording head or reduce the durability of the magnetic recording medium. Hence, its amount is naturally restricted, and the effect of adding this compound is limited. The organotin compound, on the other hand, acts as a catalyst for the crosslinking reaction of an isocyanate compound generally added to the binder. Consequently, the pot life of the resulting magnetic coating composition is extremely shortened, and its stability is reduced. Furthermore, the viscosity of the coating composition increases greatly during the coating operation to reduce the dispersibility of the magnetic powder or to reduce the surface smoothness of the resulting magnetic layer.

It has been suggested to crosslink a magnetic coated film by irradiation of electron beams in order to prepare a magnetic recording layer having excellent durability without involving the problem of pot life. But since the binder and additives used do not have entirely satisfactory properties, the desired magnetic recording layer cannot be obtained.

The present inventors made extensive investigations in order to prevent thermal decomposition of the vinyl chloride copolymer resin that occurs during the preparation of a high-density magnetic recording medium and to provide a high-density magnetic recording medium having excellent durability. These investigations have led to the discovery that a high-density magnetic recording medium having excellent durability can be obtained with a magnetic coating composition therefor having excellent thermal stability during preparation by using a vinyl chloride resin and a resin containing epoxy groups as a binder for the magnetic powder in combination with specific additives.

Thus, according to this invention, there is provided a magnetic recording medium comprising a substrate and a magnetic layer formed thereon, said magnetic layer comprising a vinyl chloride resin, a resin containing epoxy groups, and at least one additive selected from the group consisting of (1) a phosphoric acid ester, (2) a carboxylic acid compound having a pKa of not more than 4, (3) a monosulfate compound and (4) a sulfonic acid compound.

The vinyl chloride resin used in this invention denotes a homopolymer of vinyl chloride, copolymers of vinyl chloride with other monomers, and reaction products of the polymer or the copolymers. Examples of the other monomers include vinyl esters of carboxylic acids such as vinyl acetate and vinyl propionate; vinyl ethers such as methyl vinyl ether, isobutyl vinyl ether and cetyl vinyl ether; vinylidene halides such as vinylidene chloride and vinylidene fluoride; unsaturated carboxylic acid esters such as diethyl maleate, butylbenzyl maleate, di-2hydroxyethyl maleate, dimethyl itaconate, methyl (meth) acrylate, ethyl (meth)acrylate, lauryl (meth)acrylate and 2-hydroxypropyl (meth)acrylate; olefins such as ethylene and propylene; unsaturated nitriles such as (meth)acrylonitrile; and vinyl aromatic compounds such as styrene, alpha-methylstyrene and p-methylstyrene. These monomers are properly selected depending upon the purpose of increasing the solubility of the resins of this invention while adjusting the compatibility of the resins of this invention with other resins and the softening points of the resins, and the need to improve the properties of the coated film and the coating step.

Vinyl chloride resins having a hydrophilic group introduced thereinto to increase the dispersibility of the magnetic powder are more suitable as the binder. Examples of the hydrophilic group are COOM, $SO_3M$, $SO_4M$, $PO_3M_2$ and $PO_4M_2$ (wherein M is hydrogen, an alkali metal or an ammonium group).

The proportion of units of vinyl chloride in the vinyl chloride resins is usually at least 20% by weight, preferably 50 to 95% by weight. If it is less than 20% by weight, the properties of the resin are degraded, and the strength of the resulting magnetic layer is low. Hence, it cannot be used as a binder. Preferably, the vinyl chloride resins have an average degree of polymerization of 100 to 1,000. If the average degree of polymerization is less than 100, the strength and the thermal stability of the magnetic layer are poor. If it exceeds 1,000, the dispersibility of the magnetic powder or the solubility of the resins is reduced.

Examples of the epoxy group-containing resin used in this invention are epoxy-modified polyurethane resins, epoxy-modified polyester resins, epoxy-modified acrylonitrile/butadiene copolymer resin and epoxy resins.

The epoxy-modified polyurethane resin has a molecular weight of 1,000 to 200,000. If its molecular weight is less than 1,000, the durability of the magnetic layer coated is insufficient. If it exceeds 200,000, the viscosity of the magnetic coating composition is too high and causes practical troubles. The epoxy-modified polyurethane resin can be synthesized by reacting an epoxy resin having at least two hydroxyl groups per molecule such as an epoxy resin of the bisphenol A, halogenated bisphenol, resorcinol or bisphenol F type with a dibasic acid such as adipic acid, phthalic acid dimerized linoleic acid and maleic acid to prepare a hydroxylterminated polyester resin, and reacting the polyester resin with a polyfunctional polyisocyanate. Alternatively, it can be synthesized by causing an epoxidizing agent such as a peroxycarboxylic acid to act upon a polyurethane resin synthesized from an unsaturated polyester resin obtained by reacting an unsaturated fatty acid such as maleic acid, fumaric acid and itaconic acid with a polyhydric alcohol.

The epoxy-modified polyester resins have a molecular weight of 1,000 to 200,000. If the molecular weight is less than 1,000, the durability of the coated magnetic layer is insufficient. If it exceeds 200,000, the viscosity of the resulting coating composition becomes too high and causes practical troubles. The epoxy-modified polyester resins are obtained by condensing an unsaturated dibasic acid such as maleic acid, fumaric acid and itaconic acid or a saturated dibasic acid such as phthalic acid, adipic acid and terephthalic acid with a polyol such as 1,4-buanediol, 1,5-pentanediol, 1,6-hexanediol, 1,10-decanediol and a butadiene oligomer having a hydroxyl group at both ends under heat, and epoxidizing the resulting unsaturated polyester with an epoxidizing agent such as a peroxycarboxylic acid. Instead of the unsaturated polyester resin, there may be used a modified unsaturated polyester resin obtained by melt-mixing it with a polycarbonate resin or a saturated polyester resin in the presence of a catalyst and subjecting the mixture to ester-interchange reaction.

The epoxy-modified acrylonitrile/butadiene copolymer resin used generally has an acrylonitrile content of 12 to 50% by weight and a molecular weight of 5,000 to 500,000. If the content of acrylonitrile is less than 12% by weight, the resin has poor compatibility with other binders generally used in the preparation of magnetic recording media, such as polyvinyl chloride or nitrocellulose. If it is larger than 50% by weight, the solubility of the resin in solvents is reduced to greatly decrease the dispersibility of the magnetic powder. If its molecular weight is less than 5,000, the durability of the coated magnetic layer is low. If it is larger than 500,000, the viscosity of the coating composition becomes so high that the coating composition is unsuitable for practical application. The epoxy-modified acrylonitrile-butadiene copolymer resin can be obtained by copolymerizing acrylonitrile, butadiene and a radical copolymerizable monomer containing an epoxy group and as required another copolymerizable monomer in the presence of a radical initiator. Alternatively, it may be obtained by epoxidizing the double bonds of an acrylonitrile/butadiene copolymer resin partially using an epoxidizing agent such as a peroxycarboxylic acid.

The epoxy resin used in this invention has a molecular weight of 500 to 200,000. If it is less than 500, the durability of the coated magnetic layer is low, and the unreacted materials may bleed out to the surface of the magnetic layer. Such an epoxy resin is difficult to use. If, on the other hand, it exceeds 200,000, the viscosity of the coating composition is too high to be practical. Specific examples of the epoxy resin are epoxy resins of the bisphenol A/epichlorohydrin type in which the bisphenol A may be replaced by halogenated bisphenols, resorcinol, bisphenol F and tetrahydroxyphenylethane, and novolac-type epoxy resins.

The epoxy group-containing resin used in this invention may have a functional group such as COOM, $SO_3M$, $SO_4M$, $PO_3M_2$ or $PO_4M_2$ (wherein M is hydrogen, an alkali metal or an ammonium group) in order to improve the dispersibility of the magnetic powder.

To achieve the effects of this invention, it is desirable that the total amount of the vinyl chloride resin and the epoxy group-containing resin should be 5 to 50 parts by weight, particularly 10 to 30 parts by weight, per 100 parts by weight of the magnetic powder; the proportion of the epoxy group-containing resin should be 5 to 70% by weight based on the total weight of the two resins; and that the proportion of the epoxy groups should be at least 0.1% by weight based on the weight of the vinyl chloride resin.

The phosphoric acid ester compound (1) used as an additive in this invention is, for example, at least one compounds of the formulae $$(RO)_lPO(OH)_{3-l} \quad (a)$$

$$[RO(AO)_n]_lPO(OH)_{3-l} \quad (b)$$

and $$[RCOO(AO)_n]_lPO(OH)^{3}{}_{-l} \quad (c)$$

wherein R represents an alkyl group having 1 to 22 carbon atoms, a phenyl group, an alkylphenyl group, or an alkenyl group, A represents an alkylene group having 2 to 4 carbon atoms, l is 1 to 3, and n is an integer of 1 to 30.

The phosphate compound of general formula (a) is a monophosphate, a diphosphate, a sesquiphosphate or a triphosphate derived from phosphoric acid and an alkanol having 1 to 22 carbon atoms, an (alkyl)phenol or an alkenol. Specific examples of the phosphate of formula (a) include monododecyl phosphate, didodecyl phosphate, sesquidodecyl phosphate, sesquipropyl phosphate, sesquioctyl phosphate, sesquioleyl phosphate, monohexyl phosphate, dihexyl phosphate, dioctyl phosphate, monooleyl phosphate, monobutyl phosphate, dimethyl phosphate and dinonylphenyl phosphate.

The phosphate of general formula (b) is a monophosphate, a diphosphate, a sesquiphosphate or a triphosphate derived from phosphoric acid and a lower alkylene oxide adduct of an alkanol having 1 to 22 carbon atoms, an (alkyl)phoenol or an alkenol. Specific examples include sesquidodecyl polyoxyethylene (3) phosphate, sesquidodecyl polyoxyethylene (9) phosphate, monododecyl polyoxyethylene (5) phosphate, monotridecyl polyoxyethylene (7) phosphate, ditridecyl polyoxyethylene (7) phosphate, monooctadecyl polyoxyethylene (5) phosphate, sesquioctadecyl polyoxyethylene (15) phosphate, dioctyl polyoxyethylene (6) phosphate, sesquidodecyl polyoxypropylene (9) phosphate, monooctyl polyoxyethylene (12) phosphate, monooctadecenyl polyoxypropylene (8) phosphate, mononoylphenyl polyoxyethylene (6) phosphate, dinonylphenyl polyoxyethylene (67) phosphate, dinonylphenyl polyoxyethylene (4) phosphate, monobutylphenyl polyoxyethylene (6) phosphate, and trioleyl polyoxyethylene (4) phosphate.

The compound represented by general formula (c) is a monophosphate, a diphosphate, a sesquiphosphate or a triphosphate derived from phosphoric acid and a lower alkylene oxide of a fatty acid having 1 to 22 carbon atoms. Specific examples are $[C_{11}H_{25}COO(CH_2CH_2O)_{10}]_{1.5}PO(OH)_{1.5}$, $C_{17}H_{33}COO(CH_2CH_2O)_3PO(OH)_2$, $C_{17}H_{35}COO(CH_2CH_2O)_{15}PO(OH)_2$, $[C_5H_{11}COO(CH_2CH_2O)_2]_2PO(OH)$, $[CH_2:C(CH_3)COO(CH_2CH_2O]_{1.5}PO(OH)_{1.5}$, and $CH_2C(CH_3)COO[CH_2CH(CH_2Cl)O]PO(OH)_2$.

The carboxylic acid compound (2) used as the additive in this invention should have a pKa (in the case of polybasic carboxylic acids, this means $pKa_1$ unless otherwise indicated) of not more than 4. If its pKa is larger than 4, the durability of the magnetic layer cannot be increased. Carboxylic acid compounds having a pKa of not more than 4 are saturated and unsaturated aliphatic mono- and poly-carboxylic acid compounds and aromatic mono- and poly-carboxylic acid compounds. Specific examples include formic acid, monochloroacetic acid, dichloroacetic acid, trichloroacetic acid, alpha-chlorobutyric acid, monofluoroacetic acid, monobromoacetic acid, difluoroacetic acid, alpha-chloroacrylic acid, p-nitrobenzoic acid, m-nitrobenzoic acid, o-nitrobenzoic acid, m-chlorobenzoic acid, o-chlorobenzoic acid, o-toluic acid, 3,5-dinitrobenzoic acid, salicylic acid, oxalic acid, malonic acid, caproic acid, maleic acid, fumaric acid, phthalic acid, isophthalic acid, terephthalic acid, hemimellitic acid, trimellitic acid, trimesic acid, prehnitic acid, mellophanic acid, pyromellitic acid, benzenepentacarboxylic acid, mellitic acid, phenylpropiolic acid, alpha-phenylenediacetic acid, glyoxylic acid, pyruvic acid, acetoacetic acid, glycollic acid, (±)-lactic acid, (±)-mandelic acid, (−)-malic acid, (±)--malic acid, (+)-tartaric acid, (−)-tartaric acid, (±)--tartaric acid, mesotartaric acid, and citric acid.

Typical examples of the monosulfate compounds (3) used as the additive in this invention are compounds represented by the following general formulae $$HOSO_2OH \quad (a)$$

$$RO(AO)_nSO_2OH \quad (b)$$

$$RCOO(AO)_nSO_2OH \quad (c)$$

wherein R represents an alkyl group having 1 to 22 carbon atoms, a phenyl group, an alkylphenyl group, an alkenyl group or an alkenylphenyl group, A represents an alkylene group having 2 to 4 carbon atoms, and n is an integer of from 1 to 30.

The monosulfates of general formula (a) are monosulfates derived from sulfuric acid and alkanols having 1 to 22 carbon atoms, (alkyl)phenols, (alkyl)alkanols or alkenes. Specific examples are dodecyl monosulfate, oleyl monosulfate, octyl monosulfate and lauryl monosulfate.

The compounds of general formula (b) are monosulfates derived from sulfuric acid and lower alkylene oxide adducts of alkanols having 1 to 22 carbon atoms, (alkyl)phenols or alkenols. Specific examples are polyoxyethylene (4) dodecyl ether monosulfate, polyoxyethylene (5) octyl ether monosulfate, and polyoxypropylene (6) nonylphenyl ether monosulfate.

The compounds represented by general formula (c) are monosulfates derived from sulfuric acid and lower alkylene oxide esters of fatty acids having 1 to 22 carbon atoms. Specific examples are $C_5H_{11}COO(CH_2CH_2O)_2SO_2OH$, $C_{11}H_{25}COO(CH_2CH_2O)_{10}SO_2OH$, $C_{17}H_{33}COO(CH_2CH_2O)_3SO_2OH$, and $CH_2: C(CH_3)COO(CH_2CH_2CH_2O)SO_2OH$.

The sulfonic acid compound (4) used as the additive in this invention is selected from alkylarylsulfonic acids, arylsulfonic acids, alkylsulfonic acids, dialkyl sulfosuccinates, polyoxyethylene alkylaryl ether sulfosuccinates and naphthalenesulfonic acid. Specific examples are dodecylbenzenesulfonic acid, tridecylbenzenesulfonic acid, p-toluenesulfonic acid, dodecylsulfonic acid, styrenesulfonic acid, dioctyl sulfosuccinate, and 2-acrylamido-2-methylpropanesulfonic acid.

The amount of the additive selected from (1), (2), (3) and (4) is desirably 0.1 to 20 parts by weight, preferably 0.5 to 5 parts by weight, per 100 parts by weight of the magnetic powder. If it is less than 0.1 part by weight, the object of this invention is difficult to achieve. If it is larger than 20 parts by weight, the dispersibility of the magnetic powder is rather reduced, and the unreacted materials remain. The durability of the resulting magnetic layer is reduced.

In this invention, in addition to the vinyl chloride resin and the epoxy group-containing resin, the binder used in this invention may further contain an ordinary known flexible resin such as polyurethane resins, polyester resins and acrylonitrile/butadiene copolymer resin in order to improve adhesion and impart durability. To improve the dispersibility of the magnetic powder, these flexible resins may contain functional groups such as COOM, $SO_3M$, $SO_4M$, $PO_3M_2$ and $PO_4M_2$ in which M is hydrogen, an alkali metal or an ammonium group.

The magnetic powder which can be used in this invention may be a powder of any of Fe, Co, Fe alloys, Co-containing gamma-$Fe_2O_3$, Co-containing $Fe_3O_4$, gamma$Fe_2O_3$, $Fe_3O_4$, and barium-ferrite.

If required, it is also possible to add an ordinary additive such as a lubricant, a dispersing agent, an antistatic agent and an abrasive agent, and a resin for magnetic paints such as a phenoxy resin, a cellulosic resin, an amino resin, a butyral resin and an acrylic resin in amounts which do not adversely affect the achievement of the object of this invention. Furthermore, polyisocyanate compounds usually employed may be added in ordinary amounts to perform crosslinking by the reaction of the isocyanate groups.

Compounds containing unsaturated groups such as an alkenyl group are used as the additive, the resulting coated layer can be crosslinked by irradiation of electron beams. In this case, electron beam-curable resins, oligomers and monomers having at least one unsaturated bond within the molecule may be used together.

A magnetic coating composition can be obtained by mixing the vinyl chloride resin, the epoxy group-containing resin, the magnetic powder and the additive and optional components, and dispersing the mixture in an organic solvent. The magnetic coating composition is coated on a substrate such as a polyester film by any desired means such as blade coating, bar coating, gravure roll coating or roll coating, and dried to form a magnetic layer. As a result, the magnetic recording medium of this invention is obtained.

Thus, the present invention can give a magnetic recording medium having higher thermal stability, dispersibilty and durability than in the prior art.

It is presumed that the improvement in thermal stability in this invention is achieved by a mechanism whereby hydrogen chloride generated by thermal decomposition of the vinyl chloride resin is captured by the epoxy groups in the molecular chains of the epoxy group-containing resin and prevent a chain reaction of decomposition. According to this invention, the magnetic recording medium is free from bleed out of the binder to the surface of the magnetic layer which causes contamination to the recording head and from the increase of tackiness in the recording medium in tape form which causes a reduction in the travelling property of the tape, and exhibits a very good improving effect as compared with the use of known compounds, for example low-molecular-weight compounds such as epoxidized soybean oil.

It is theorized that according to this invention, since in the dispersing step, the epoxy groups act as a heat stabilizing agent, and the acid groups, as a dispersant, a magnetic coating composition having excellent thermal stability and dispefsibility can be obtained; and that since the reaction between the epoxy groups and the acid groups proceeds subsequently to the step of coating the magnetic coating compositions and forming the magnetic layer, a product having enhanced abrasion resistance and durability can be obtained.

The following examples illustrate the present invention more specifically. Unless otherwise specified, all parts and percentages in these examples are by weight.

REFERENTIAL EXAMPLE 1

A bisphenol A-type epoxy resin having an epoxy equivalent of 182 to 194 and a molecular weight of 355 was reacted with adipic acid to synthesize a polyester resin. To the reaction product was added 4,4'-diphenylmethane diisocyanate to give an epoxy-modified polyurethane resin having a molecular weight of about 17,000 and an epoxy group content of 10%.

REFERENTIAL EXAMPLE 2

An unsaturated polyester resin obtained by condensing maleic anhydride, mixed phthalic acid, and 1,4-butanediol under heat was epoxidized with peroxyacetic acid in toluene to give an epoxy-modified polyester resin having a molecular weight of 9,000 and an epoxy group content of 6%.

REFERENTIAL EXAMPLE 3

An acrylonitrile/butadiene copolymer resin having an acrylonitrile content of 30% and an average molecular weight of 30,000 and an average molecular weight of 30,000 was partially epoxidized with peroxyacetic acid to give an epoxy-modified acrylonitrile/ butadiene copolymer resin having an epoxy group content of 8%.

EXAMPLES

TEST FOR THERMAL STABILITY

One gram of each of the vinyl chloride resins indicated in Tables 1 to 3 and 1 g of each of the epoxy group-containing resins indicated in Tables 1 to 3 were dissolved in tetrahydrofuran, and 0.2g of each of the additives indicated in Tables 1 to 3 and 0.4 g of polyisocyanate (Coronate L, a product of Japan Polyurethane Industry Co., Ltd.) were added to the solution. The resulting coating composition was coated by a doctor blade. The solvent was volatilized to form a cast film. One gram of the cast film was taken into a 15 cc test tube, and its opening portion was stopped with adsorbent cotton holding Congo Red paper. The test tube was placed in an oil bath at 150° C., and the time (minutes) which elapsed until the generated hydrogen chloride discolored the Congo Red test paper. Larger measured values of the time mean higher thermal stability.

TEST FOR GLOSS

A mixture composed of 400 parts of a powder of cobalt-doped magnetic iron oxide, 70 parts of each of the vinyl chloride resins indicated in Tables 1 to 3, 30 parts of the same epoxy group-containing resin as used in the test for thermal stability, 8 parts of each of the additives indicated in Tables 1 to 3, 300 parts of methyl ethyl ketone, 300 parts of methyl isobutyl ketone and 300 parts of toluene was dispersed for 90 minutes under high speed shearing. Twenty parts of the same polyisocyanate as used in the test for thermal stability was added, and the mixture was dispersed for 10 minutes to prepare a magnetic coating composition.

In Runs Nos. 8, 9, 18, 19, 28 and 29 in which the compounds containing an unsaturated group were used as the additives, the polyisocyanate was not added.

The resulting magnetic coating composition was coated on a polyester film to a thickness of 5 micrometers, subjected to magnetic field orientation, and dried. The reflectance of the resulting magnetic coated film at an incidence angle of 60° was measured by a glossmeter. Larger measured values of the reflectance mean better dispersibility of the magnetic powder.

TEST FOR DURABILITY

The magnetic coated film used in the test for gloss was smoothened by a calender roll, and crosslinked and aged for 40 hours in a constant-temperature vessel at 65 ° C.

In Runs Nos. 8, 9, 18, 19, 28 and 29 in which the compounds containing an unsaturated group were used as the additives and the polyisocyanate was not added, irradiation of electron beams at a dose of 10 Mrads was carried out by using an electron beam accelerator in place of performing the aforesaid aging.

The resulting magnetic coated film was brought into contact under a load of 100 1g with a rotating drum having a diameter of 40 mm to which abrasive paper was attached, and the rotating drum was rotated at 150 rpm for a predetermined period of time. The degree of soiling adhering to the abrasive paper was visually observed, and the results was evaluated on the following scale.

Good: not soiling
Fair: some soiling
Poor: heavy soiling

The test results are summarized in Tables 1 to 3.

The results given in Tables 1 to 3 demonstrate that according to this invention, magnetic recording media having excellent thermal stability, dispersibility and durability can be obtained.

TABLE 1

| Run No. | Vinyl chloride resin | Epoxy group-containing resin | Phosphoric acid ester | Thermal stability (minutes) | Gloss (%) | Durability |
|---|---|---|---|---|---|---|
| 1 | Commercial resin A (**) | Epoxy-modified polyurethane resin of Referential Example 1 | Mixture of monotridecyl polyoxyethylene (7) phosphate and ditridecyl polyoxyethylene (7) phosphate | 29 | 68 | good |
| 2 | Commercial resin A (**) | Epoxy-modified polyester resin of Referential Example 2 | Mixture of mononoylphenyl polyoxyethylene (6) phosphate and dinonylphenyl polyoxyethylene (6) phosphate | 28 | 69 | good |
| 3 | Commercial resin A (**) | Epoxy-modified acrylonitrilebutadiene copolymer resin of Referential Example 2 | Dioctyl phosphate | 30 | 67 | good |
| 4 | Commercial resin B (***) | Epoxy-modified polyester resin of Referential Example 2 | Monobutyl phosphate | 27 | 70 | good |
| 5 | Commercial resin B (***) | Epoxy-modified polyester resin of Referential Example 2 | $[C_5H_{11}COO(CH_2CH_2O)_2]_2PO(OH)$ | 27 | 71 | good |
| 6 (*) | Commercial resin A (**) | Nippolane 2304 (made by Japan Polyurethane Co., Ltd.) | Mixture of monotridecyl polyoxyethylene (7) phosphate and ditridecyl polyoxyethylene (7) phosphate | 3 | 68 | fair |
| 7 (*) | Commercial resin A (**) | Epoxy-modified acrylonitrilebutadiene copolymer resin | None | 3 | 65 | fair |
| 8 | Commercial resin A (**) | Epoxy-modified polyurethane resin of Referential Example 1 | $[CH_2{:}C(CH_3)COO(CH_2CH_2O)]_{1.5}PO(OH)_{1.5}$ | 29 | 67 | good |
| 9 (*) | Commercial resin A (**) | Nippolane 2304 | $[CH_2{:}C(CH_3)COO(CH_2CH_2O)]_{1.5}PO(OH)_{1.5}$ | 3 | 65 | poor |

(*): Comparison
(**): Vinyl chloride/vinyl acetate/vinyl alcohol copolymer resin
(***): Vinyl chloride/vinyl acetate/maleic acid/vinyl alcohol copolymer resin

TABLE 2

| Run No. | Vinyl chloride resin | Epoxy group-containing resin | Carboxylic acid compound Type | Carboxylic acid compound pKa | stability (minutes) | Gloss (%) | Durability |
|---|---|---|---|---|---|---|---|
| 10 | Commercial resin A (**) | Epoxy-modified polyurethane resin of Referential Example 1 | Malonic acid | 2.85 | 29 | 65 | good |
| 11 | Commercial resin A (**) | Epoxy-modified polyester resin of Referential Example 2 | Maleic acid | 2.00 | 28 | 69 | good |
| 12 | Commercial resin A (**) | Epoxy-modified acrylonitrilebutadiene copolymer resin of Referential Example 3 | Salicylic acid | 2.98 | 30 | 63 | good |
| 13 | Commercial resin B (***) | Epoxy-modified polyester resin of Referential Example 2 | Pyruvic acid | 2.49 | 27 | 66 | good |
| 14 | Commercial resin B (***) | Epoxy-modified polyester resin of Referential Example 2 | Fumaric acid | 3.02 | 27 | 67 | good |
| 15 (*) | Commercial resin A (**) | Nippolane 2304 | Malonic acid | 2.85 | 3 | 52 | fair |
| 16 (*) | Commercial resin A (**) | Epoxy-modified acrylonitrilebutadiene copolymer resin of Referential Example 3 | None | — | 30 | 49 | fair |
| 17 (*) | Commercial resin A (**) | Epoxy-modified acrylonitrilebutadiene copolymer resin of Referential Example 3 | Caproic acid | 4.84 | 29 | 48 | fair |
| 18 | Commercial resin A (**) | Epoxy-modified polyurethane resin of Referential Example 1 | Maleic acid | 2.00 | 28 | 69 | good |
| 19 (*) | Commercial resin A (**) | Nippolane 2304 | Maleic acid | 2.00 | 3 | 53 | poor |

(*), () and (*) are the same as the footnote to Table 1.

TABLE 3

| Run No. | Vinyl chloride resin | Epoxy group-containing resin | Monosulfate compound or sulfonic acid compound | Thermal stability (minutes) | Gloss (%) | Durability |
|---|---|---|---|---|---|---|
| 20 | Commercial resin A (**) | Epoxy-modified polyurethane resin of Referential Example 1 | Monolauryl sulfate | 30 | 65 | good |
| 21 | Commercial resin A (**) | Epoxy-modified polyester resin of Referential Example 2 | Polyoxylthylene (5) octylether monosulfate | 28 | 64 | good |
| 22 | Commercial resin A (**) | Epoxy-modified acrylonitrilebutadiene copolymer resin of Referential Example 3 | $C_5H_{11}COO(CH_2CH_2O)_2SO_2OH$ | 31 | 65 | good |
| 23 | Commercial resin A (**) | Epikote 828 (produced by Shell Chemical Co., Ltd.) | Monooleyl sulfate | 29 | 63 | good |
| 24 | Commercial resin B (***) | Epoxy-modified polyurethane resin of Referential Example 1 | Dodecylbenzenesulfonic acid | 30 | 68 | good |
| 25 | Commercial resin B (***) | Epoxy-modified polyester resin of Referential Example 2 | Dioctyl sulfosuccinate | 29 | 67 | good |
| 26 (*) | Commercial resin A (**) | Nippolane 2304 | Monolauryl sulfate | 3 | 64 | fair |
| 27 (*) | Commercial resin A (**) | Epoxy-modified acrylonitrile/ butadiene copolymer resin | None | 3 | 60 | fair |
| 28 | Commercial resin A (**) | Epoxy-modified polyurethane resin of Referential Example 1 | 2-acrylamide-2-methyl-propanesulfonic acid | 30 | 65 | good |
| 29 (*) | Commercial resin A (**) | Nippolane 2304 | 2-acrylamide-2-methyl-propanesulfonic acid | 3 | 64 | poor |

(*), () and (*) and the same are the footnote to Table 1.

What is claimed is:

1. A magnetic recording medium comprising a substrate and a magnetic layer formed thereon, said magnetic layer comprising a magnetic powder, a vinyl chloride resin selected from the group consisting of a homopolymer of vinyl chloride and a copolymer composed of 50 to 90% by weight of vinyl chloride and 50 to 5% by weight of another monomer, said vinyl chloride resin having an average degree of polymerization of from 100 to 1,000, from 5 to 70% by weight, based on the total weight of the vinyl chloride resin and the below-defined epoxy group-containing resin, of a resin containing an epoxy group which is selected from the group consisting of epoxy-modified polyurethane resins, epoxy-modified polyester resins and epoxy- modified acrylonitrile/butadiene copolymer resin, and from 0.1 to 20 parts by weight, per 100 parts by weight of the magnetic powder, of at least one additive selected from the group consisting of (1) a phosphoric acid ester, (2) a carboxylic acid compound having a pKa of not more than 4, (3) a monosulfate compound and (4) a sulfonic acid compound; the total amount of said vinyl chloride resin and said epoxy group-containing resin being 5 to 50 parts by weight, per 100 parts by weight of said magnetic powder.

2. The magnetic recording medium of claim 1 wherein the vinyl chloride resin is a copolymer composed of 50 to 95% by weight of vinyl chloride and 50 to 5% by weight of another monomer selected from the group consisting of vinyl ester of carboxylic acids, vinyl ethers, vinylidene halides, unsaturated carboxylic acid esters, olefins, unsaturated nitriles and aromatic vinyl compounds.

3. The magnetic recording medium of claim 1 wherein the additive is the phosophoric acid ester compound and is selected from the group consisting of compounds represented by the general formulae $$(RO)_l PO(OH)_{3-l} \quad (a)$$

$$[RO(AO)_n]_l PO(OH)_{3-l} \quad (b)$$

and $[RCOO(AO)_n]_l PO(OH)_{3-l}$ (c)

wherein R represents an alkyl group having 1 to 22 carbon atoms, a phenyl group, an alkylphenyl group or an alkenyl group, A represents an alkylene group having 2 to 4 carbon atoms, l is 1 to 3, and n is 1 to 30.

4. The magnetic recording medium of claim 1 wherein the additive is the carboxylic acid compound having a pKa of not more than 4 and is selected from the group consisting of saturated and unsaturated aliphatic mono- and poly-carboxylic acid compounds and aromatic mono- and poly-carboxylic acid compounds.

5. The magnetic recording medium of claim 1 wherein the additive is the monosulfate compound and is selected from the group consisting of compounds represented by the following formulae $$ROSO_2OH \quad (a)$$

$$RO(AO)_nSO_2OH \quad (b)$$

$$RCOO(AO)_nSO_2OH \quad (c)$$

wherein R represents an alkyl group having 1 to 22 carbon atoms, a phenyl group, an alkylphenyl group, an alkenyl group or an alkenylphenyl group, A represents an alkylene group having 2 to 4 carbon atoms, and n represents an integer of 1 to 30.

6. The magnetic recording medium of claim 1 wherein the additive is the sulfonic acid compound and is selected from the group onsisting of alkylarylsulfonic acids, arylsulfonic cids, alkylsulfonic acids, dialkyl sulfosuccinates, polyoxyethylene alkylaryl ether sulfosuccinates and naphthalenesulfonic acid.

7. The magnetic recording medium of claim 1 wherein the vinyl chloride resin is a homopolymer of vinyl chloride.

8. The magnetic recording medium comprising a substrate and a magnetic layer formed thereon, said magnetic layer comprising a magnetic powder, a vinyl chloride resin selected from the group consisting of a homopolymer of vinyl chloride or a copolymer composed of 50 to 95% by weight of vinyl chloride and 50 to 5% by weight of another monomer, said vinyl chloride resin having an average degree of polymerization of from 100 to 1,000, from 5 to 70% by weight, based on the total weight of the vinyl chloride resin and the below defined epoxy group-containing resin, of a resin containing an epoxy group having a molecular weight of from 500 to 500,00 and being selected from the group consisting of epoxy-modified polyurethane resins, epoxy-modified polyester resins and epoxy-modified acrylonitrile/butadiene copolymer resin, with the proportion of the epoxy group in said epoxy group-containing resin being at least 0.1% by weight, based on the vinyl chloride resin and at least one additive selected from the group consisting of (1) a phosphoric acid ester, (2) a carboxylic acid compound having a pKa of not more than 4, (3) a monosulfate compound and (4) a sulfonic acid compound wherein the amount of additive is 0.1 to 20 parts by weight per 100 parts of the magentic powder and the total amount of the vinyl chloride resin and the epoxy group-containing resin is from 5 to 50 parts by weight per 100 parts by weight of the magnetic powder.

9. The magnetic recording medium of claim 8 wherein the vinyl chloride resin is a homopolymer of vinyl chloride.

* * * * *